Figure 1:
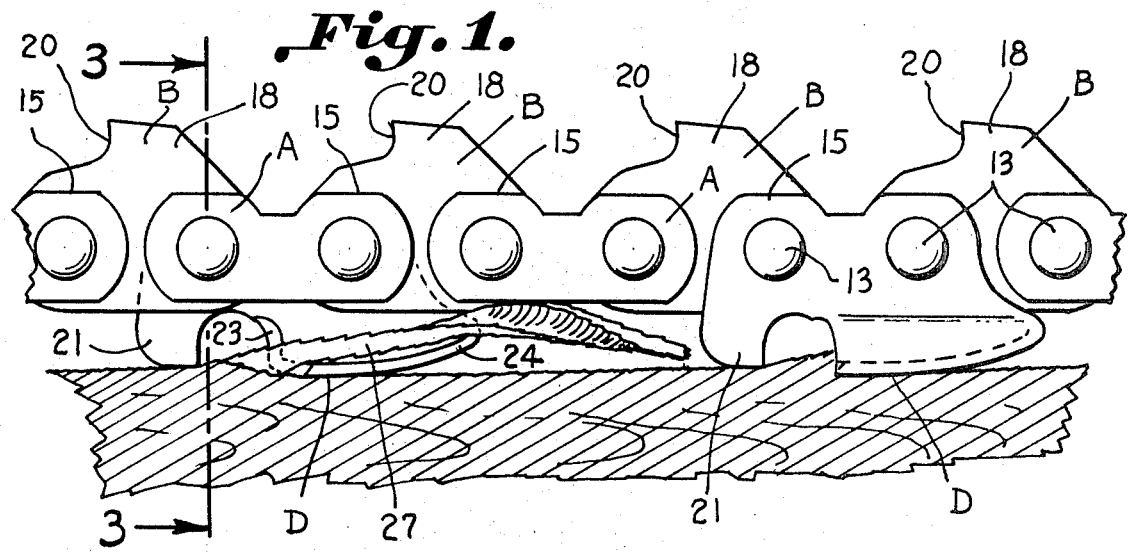

United States Patent

[11] 3,625,266

| [72] | Inventor | Paul H. Kennemore<br>P.O. Box 12, Greenwood, S.C. 29646 |
|------|----------|----------|
| [21] | Appl. No. | 878,659 |
| [22] | Filed | Nov. 21, 1969 |
| [45] | Patented | Dec. 7, 1971 |

[54] CHIP EJECTOR CHAIN TOOTH
1 Claim, 4 Drawing Figs.

[52] U.S. Cl. .................................................. 143/135 G
[51] Int. Cl. .................................................. B27b 33/14
[50] Field of Search .......................................... 143/135 F, 135 G, 135 H

[56] References Cited
UNITED STATES PATENTS

| 2,508,784 | 5/1950 | Cox | 143/135 G |
| 2,850,057 | 9/1958 | Carlberg | 143/135 G |
| 3,144,059 | 8/1964 | Oehrli | 143/135 G |

FOREIGN PATENTS

| 959,944 | 3/1957 | Germany | 143/135 H |

*Primary Examiner*—Donald R. Schran
*Attorney*—Bailey and Dority

ABSTRACT: A saw chain having a plurality of spaced teeth coupled together by means of tie straps and drive links. Each of the teeth has an elongated substantially vertical sideplate and a top plate. A chip ejector is integral with the top plate and sideplate for turning chips during a cutting operation upwardly and laterally from the top plate in order to aid in ejecting the chips from the kerf.

PATENTED DEC 7 1971 3,625,266

INVENTOR.
PAUL H. KENNEMORE
BY Bailey & Douty
ATTORNEYS.

CHIP EJECTOR CHAIN TOOTH

This invention relates to a saw chain, and more particularly to an improved tooth of a saw chain having a chip ejector integral with the rear portion of the tooth.

Chip removal has always been one of the leading problems with saw chains. If the chip is not removed from the kerf during the cutting operation, the chain saw will tend to bounce and the operator will have to exert a downward pressure so as to cause the teeth of the chain saw to bite into the wood. Not only does this require more manual labor in cutting logs and the like, it also increases the friction between the movable elements in the chain saw. For example, the friction between the cutter bar and chain is increased. As a result of this increased friction, the life of the cutter bar, chain, sprocket, and motor is shortened.

It has been found that by placing a chip ejector adjacent the rear of the tooth for both right- and left-hand cutters, such produces a smooth and rapid cutting action as a result of the tooth ejecting the chips outwardly and upwardly into the path of the following tooth in order to facilitate a clean and efficient chip removal. If the chips were not removed from the kerf the following tooth would ride upon such, tending to produce the bouncing motion previously mentioned.

The chip ejector constructed in accordance with the present invention turns the end of the chip up into the center of the kerf, causing less inward tearing of the chip and more rapid chip removal. For example, if we are referring to the left-hand tooth it will turn the end of the chip up into the center of the kerf so that the next left-hand tooth of the chain will run in new wood without chips being there. It also clears the path for the following depth gauge of the right-hand tooth. It is to be understood that the chip ejector can be used on any of the commonly referred to L-shaped chain teeth, such as the chipper, semichisel and chisel-type teeth.

The chain constructed in accordance with the present invention has the same component and cutting edges as conventional chains, such as illustrated in the Cox U.S. Pat. No. 2,508,784 granted May 23, 1950, or the Merz U.S. Pat. No. 2,632,484 granted Mar. 24, 1953. However, it also has a chip ejector carried adjacent the rear of each tooth. In one preferred embodiment this chip ejector is integral with the rear portion of the sideplate and extends inwardly towards the longitudinal axis of the chain and also upwardly away from the top plate.

Accordingly, it is an important object of the present invention to provide a saw chain which has a chip ejector carried thereon for aiding in removing chips during the cutting operation.

Another important object of the present invention is to provide a tooth of a saw chain with a chip ejector which aids in stabilizing the operation of the saw chain.

Still another important object of the present invention is to provide a tooth of a saw chain, with a chip ejector which turns the end of a chip up into the center of the kerf minimizing the tearing action of the tooth and facilitating the removal of the chip.

Another important object of the present invention is to provide a chip ejector for a tooth of a chain saw in order to improve the cutting action of the saw chain as a result of the teeth running in a clean kerf.

Still another important object of the present invention is to provide a tooth of a saw chain with a chip ejector so as to minimize the pressure required on the cutter bar during the cutting operation as a result of the chain cutting in a clean kerf.

The construction designed to carry out the invention will be hereinafter described, together with other features thereof.

Figure 2:
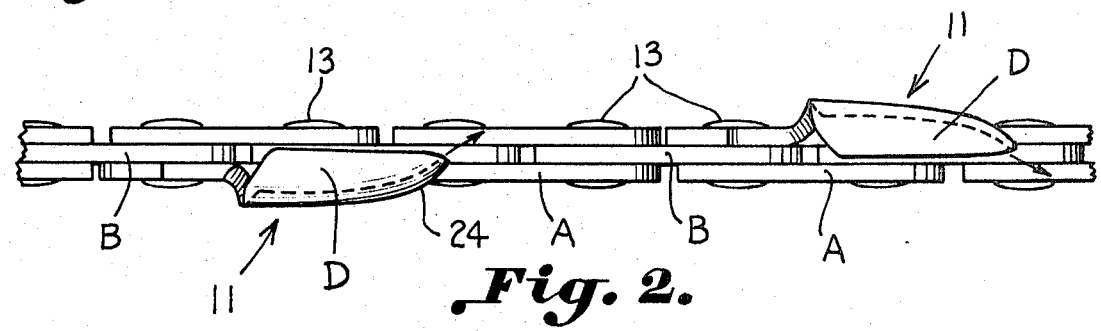
Figure 3:
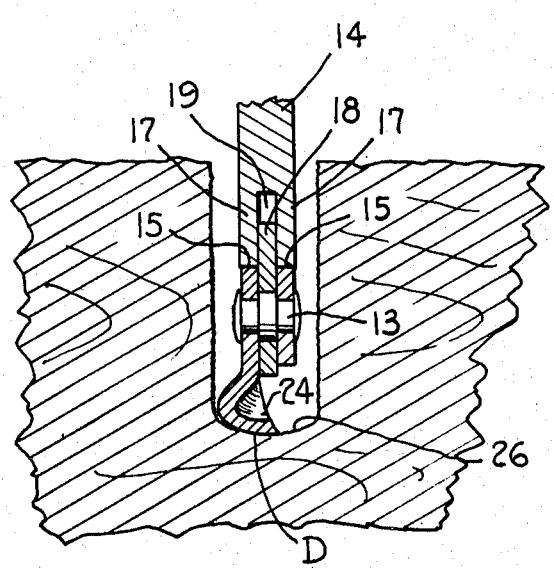
Figure 4:
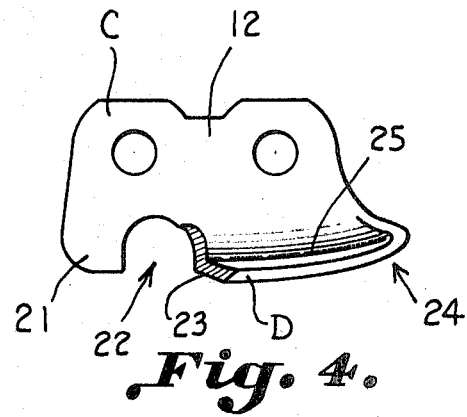

The invention will be more readily understood from a reading of the following specification and by reference to the accompanying drawing forming a part thereof, wherein an example of the invention is shown and wherein:

FIG. 1 is a side elevational view illustrating a portion of a saw chain cutting in wood, FIG. 2 is a top plan view illustrating a portion of the saw chain which has teeth thereon constructed in accordance with the present invention, FIG. 3 is a transverse sectional view taken along line 3—3 of FIG. 1, and FIG. 4 is an enlarged side elevational view of a tooth constructed in accordance with the present invention.

The drawing illustrates a saw chain having a plurality of spaced teeth which are coupled together by means of tie straps A and drive links B. Each of the teeth has an elongated substantially vertical sideplate C with holes therein for receiving rivets for securing the teeth to the tie straps A and the drive links B. An elongated top plate D is integral with the sideplate C defining a junction where they are joined. The top plate extends over the longitudinal axis of the saw chain and has a front cutting edge which extends rearwardly at an acute angle. A rear portion of the tooth adjacent the junction of the top plate D and the sideplate C extends inwardly towards the longitudinal axis of the chain and extends upwardly away from the top plate for turning chips during a cutting operation upwardly and laterally from the top plate.

The teeth of the saw chain are broadly designated at 11 and are coupled together by means of the tie strap A and drive link B. The foot 12 of each tooth has a pair of longitudinally spaced holes disposed therein for accommodating rivets 13. Each of the tie straps A and the drive links B have a pair of longitudinally spaced apertures therein also. In assembling the chain a hole of the drive link B is placed in alignment with a corresponding hole on the tooth and a tie strap A. A rivet 13 is passed through the apertures of the tie strap A, the drive link B, and the tooth 11 in that order, so as to secure them together. It is important that this linkage be a pivotal linkage so that the chain will run properly within the guide bar 14 of the chain saw. The other end of the drive link is sandwiched between a pair of tie straps A and a rivet 13 is passed therethrough securing such together. Another drive link B is sandwiched between the other end of the tie strap A and secured thereto by rivets 13. The second tooth illustrated in Fig. 1 is joined to the free end of the drive link B by means of a tie strap A and a rivet 13 passing through the three members. Illustrated in FIG. 1 is both a right-hand cutter or tooth and a left-hand tooth, each of which is provided with a chip ejector adjacent the rear portion thereof.

It is noted that when the chain is running in the guide bar 14 the bottom edge 15 of the tie strap and the foot 12 of each tooth ride on the laterally disposed rails 17 of the guide bar 14. The base 18 of the drive link B rides within the groove 19 defined by the laterally disposed rail 17 of the guide bar 14. The base 18 of the drive link has a tang 20 adjacent its front edge for maintaining the groove 19 of the guide bar 14 clean from sawdust, grit and the like.

FIG. 4 illustrates the desired position of the chain when such is running properly in the guide bar 14. If the chain runs to one side, the bottom edge of the base 18 of the drive link B will wear as a result of the increase in frictional contact with an inner surface of the rail 17. If the chain is permitted to run to the side for a period of time, the bottom edge of the drive link will be sharpened to a point impairing its ability to maintain the groove 19 clean. If the groove is not maintained clean, then grit and sawdust is permitted to collect therein, the chain will not ride smoothly on the guide bar 14, and as a result, undue strain and wear is imparted to the saw chain, the sprocket and the motor for the chain.

Each of the teeth shown in the drawing includes a vertical sideplate C which has a substantially flat top plate D integral with one edge thereof. A depth gauge 21 is spaced longitudinally from the top plate D and is integral with the sideplate C. The depth gauge 21 aids in controlling the depth of the cut made by the teeth during the cutting operation. A gullet 22 is defined between the depth gauge 21, the tope plate D and the sideplate C. Adjacent the front edge of the top plate is a hollow-ground cutting edge 23 which tapers rearwardly at an angle. The rear portion 24 of the top plate D and the sideplate C adjacent the junction 25 where such meets curves inwardly towards the longitudinal axis beyond the sideplate C, such as best illustrated in FIG. 2, and extends upwardly away from the main body portion of the top plate, such as best illustrated in FIGS. 1 and 4 for turning chips during a cutting operation laterally and upwardly from the top plate. This rear portion 24 of the tooth is an ejector means which aids in ejecting chips from the kerf 26 being cut in the wood by turning the end of the chip up into the center of the kerf, into the path of the following tooth. The rear portion 24 acts similar to the blade of a plow turning soil during a plowing operation.

This rear portion 24 also aids in stabilizing the tooth through the entire cutting cycle of inward tearing and outward gouging and thus, increases the life of all the components of the saw chain, such as the cutter bar 14, the components of the chain and the sprocket motor (not illustrated).

As can be seen in FIG. 1, the edge of the chip 27 adjacent the cutter edge 23 illustrated in FIG. 1, is cut thereby and the ejector portion 24 of the tooth turns that edge into the center of the kerf 26 causing less inward tearing. The following tooth which in FIG. 1 is on the right-hand side, cuts on the other side of the kerf. The chips coming out of the log being cut are shorter than conventional chips and there is a greater cutting action as a result of their removal. While it is difficult to explain the theory of the cutting operation, it is believed that alternate teeth of the saw chain are cutting in new wood, rather than riding over chips. Therefore, the chain is self-feeding requiring less downward pressure by the operator during the cutting operation. Other advantages of the tooth as a result of the rear ejector portion 24 is that there is a longer life between the sharpening operation as a result of the tooth cutting in wood at all times rather than riding on chips that have already been cut. The life of the chain is also increased because of the extra strength added by the rear portion 24. The chip ejector 24 is an integral part of the tooth, therefore, it can be stamped in one operation of manufacture.

As previously mentioned, saw chains, such as the chipper, semichisel and chisel-type have an inward tearing and outward gouging action during the cutting operation. The chip ejector portion 24 adjacent the rear of the tooth stabilizes the tooth through the entire cutting cycle of inward tearing and outward gouging and increases the life of all components of the saw by readily ejecting the chips from the kerf.

What is claimed is:

1. In a saw chain having a plurality of spaced teeth coupled together by means of tie straps and drive links, each of said teeth comprising an elongated substantially vertical sideplate, spaced holes provided in said sideplate for receiving rivets for securing said teeth to said tie straps and drive links, and an elongated top plate integral with said sideplate defining a junction and extending over the longitudinal axis of said saw chain, said top plate having a front cutting edge extending rearwardly at an angle, the improvement including: a rear portion of said tooth adjacent the junction of said top plate and said sideplate curving inwardly towards the longitudinal axis of said chain beyond said sideplate and extending upwardly away from said top plate for turning chips during a cutting operation laterally and upwardly from said top plate.

* * * * *